(12) United States Patent
Benedetti

(10) Patent No.: US 9,657,759 B2
(45) Date of Patent: May 23, 2017

(54) U-BASED FASTENER WITH IMPROVED RIB ATTACHMENT

(71) Applicant: Newfrey LLC, Newark, DE (US)

(72) Inventor: Steven Michael Benedetti, Sterling Heights, MI (US)

(73) Assignee: Newfrey LLC, New Britain, CT (US)

( * ) Notice: Subject to any disclaimer, the term of this patent is extended or adjusted under 35 U.S.C. 154(b) by 217 days.

(21) Appl. No.: 14/482,083

(22) Filed: Sep. 10, 2014

(65) Prior Publication Data

US 2016/0068118 A1    Mar. 10, 2016

(51) Int. Cl.
  *F16B 5/06*  (2006.01)
  *F16B 21/08* (2006.01)

(52) U.S. Cl.
  CPC .......... *F16B 5/0657* (2013.01); *F16B 21/086* (2013.01)

(58) Field of Classification Search
  CPC ...... F16B 5/0657; F16B 5/065; F16B 21/086; F16B 21/075; F16B 2/22; F16B 5/0642
  See application file for complete search history.

(56) References Cited

U.S. PATENT DOCUMENTS

| | | |
|---|---|---|
| 3,864,789 A | 2/1975 | Leitner |
| 4,644,612 A | 2/1987 | Osterland |
| 5,542,158 A | 8/1996 | Gronau et al. |
| 5,887,319 A | 3/1999 | Smith |
| 5,966,782 A | 10/1999 | Ishihara et al. |
| 6,353,981 B1 | 3/2002 | Smith |
| 6,745,440 B2 | 6/2004 | Vassiliou |
| 7,051,408 B2 | 5/2006 | De Azevedo et al. |
| 7,188,392 B2 | 3/2007 | Giugliano et al. |
| 7,300,089 B2 | 11/2007 | Kuroda |
| 7,428,770 B2 | 9/2008 | Dickenson et al. |
| 7,461,436 B2 | 12/2008 | Asano |
| 7,640,634 B2 | 1/2010 | Vassiliou |
| 7,862,273 B2 | 1/2011 | Ooyama et al. |
| 8,152,405 B2 | 4/2012 | Dubost |
| 2013/0340216 A1 | 12/2013 | Smith et al. |

FOREIGN PATENT DOCUMENTS

FR    EP1830073 A1 * 9/2007 ................ F15B 2/22

* cited by examiner

*Primary Examiner* — Jack W Lavinder
(74) *Attorney, Agent, or Firm* — Harness, Dickey & Pierce, PLC

(57) ABSTRACT

A resilient fastener is provided and is usable with a panel having either a first thickness or a second thickness. The fastener includes a main body member, a first spring arm and a second spring arm. The main body member includes an anterior side and a posterior side. The first spring arm is disposed on the anterior side of the main body member. The first spring arm includes a first shoulder portion positioned to engage against a surface of a first panel having the first thickness. The second spring arm is disposed on the anterior side of the main body member. The second spring arm includes a second shoulder portion positioned to engage against a surface of a second panel. The second panel includes the second thickness which is less than the first thickness.

26 Claims, 11 Drawing Sheets

U-BASED FASTENER WITH IMPROVED RIB ATTACHMENT

FIELD

The present disclosure relates to a fastener and fastening system used for removably mounting a first vehicle component, such as a trim panel, to a second vehicle component, such as a body panel.

BACKGROUND

This section provides background information related to the present disclosure and is not necessarily prior art.

Clips and fasteners can be used to retain trim panels and other components (e.g., exterior moldings, mirrors, instrument panels, etc.) relative to a body portion of an automobile or other vehicle. Known fasteners are designed for a specific application. In this regard, known fasteners are often designed for a vehicle body portion having a certain or predetermined thickness. Accordingly, as the thickness of a body panel varies from one vehicle to another vehicle, different fasteners must be specifically designed and manufactured in order to accommodate different thicknesses.

Known fasteners are also designed to be coupled to a rib on the trim panel. In this regard, known fasteners often include a retention feature (e.g., a barb) that engages the rib to secure the fastener to the trim panel. It may be possible to mount known fasteners on the rib in either a proper orientation or an improper or backward orientation, resulting in the fastener sometimes being improperly mounted on the rib. In addition, it can be difficult to determine whether a known fastener is correctly and fully seated on the rib such that the fastener is sometimes pushed too far, or not far enough, onto the rib.

It would be desirable to provide a fastener that can be used with a body panel having a first thickness, and also be used with another body panel having a second thickness that is greater or less than the first thickness. It would also be desirable to provide a fastener and a rib on a trim panel or other component that can provide for secure and robust engagement between the fastener and the rib, and that allows the user to ensure accurate and complete assembly between the fastener and the rib.

SUMMARY

This section provides a general summary of the disclosure, and is not a comprehensive disclosure of its full scope or all of its features.

In accordance with a first aspect of the present disclosure, a resilient fastener is usable with a panel having either a first thickness or a second thickness. The fastener includes a main body member, a first spring arm and a second spring arm. The main body member includes an anterior side and a posterior side. The first spring arm is supported by the main body member such that the first spring arm is disposed on the anterior side of the main body member. The first spring arm includes a first shoulder portion positioned to engage against a surface of a first panel having the first thickness. The second spring arm is supported by the main body member such that the second spring arm is disposed on the anterior side of the main body member. The second spring arm includes a second shoulder portion positioned to engage against a surface of a second panel. The second panel includes the second thickness which is less than the first thickness.

In accordance with another aspect of the present disclosure, a fastening assembly is provided. The fastening assembly includes a first component and a fastener. The fastener includes a main body member having a first lateral end and a second lateral end. The first lateral end includes a first plurality of saw teeth, and the second lateral end includes a second plurality of saw teeth. The first component includes a rib extending therefrom. The rib includes a web portion and first and second flange portions. The web portion and the first flange portion define a first channel configured to receive the first plurality of saw teeth. The web portion and the second flange portion define a second channel configured to receive the second plurality of saw teeth.

In accordance with yet another aspect of the present disclosure, a resilient fastener is provided. The fastener is usable with a panel having either a first thickness or a second thickness. The fastener includes a main body member, a first spring arm, and a second spring arm. The main body member includes a proximal end, a distal end, an anterior side and a posterior side, the main body member extends along a main longitudinal axis from and between the proximal and distal ends. The first spring arm extends from the main body member along a first spring arm axis. The first spring arm axis forms a first angle with the main longitudinal axis, such that the first spring arm is disposed on the anterior side of the main body member. The first spring arm includes a first shoulder positioned to engage against a surface of a first panel having the first thickness. The second spring arm extends from the main body member along a second spring arm axis. The second spring arm axis forms a second angle with the main longitudinal axis, such that the second spring arm is disposed on the anterior side of the main body member. The second spring arm includes a second shoulder that is offset from the first shoulder by an offset distance. The offset distance is measured in a direction substantially parallel to the main longitudinal axis, such that the second shoulder is positioned to engage against a surface of a second panel having the second thickness. The second thickness is less than the first thickness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
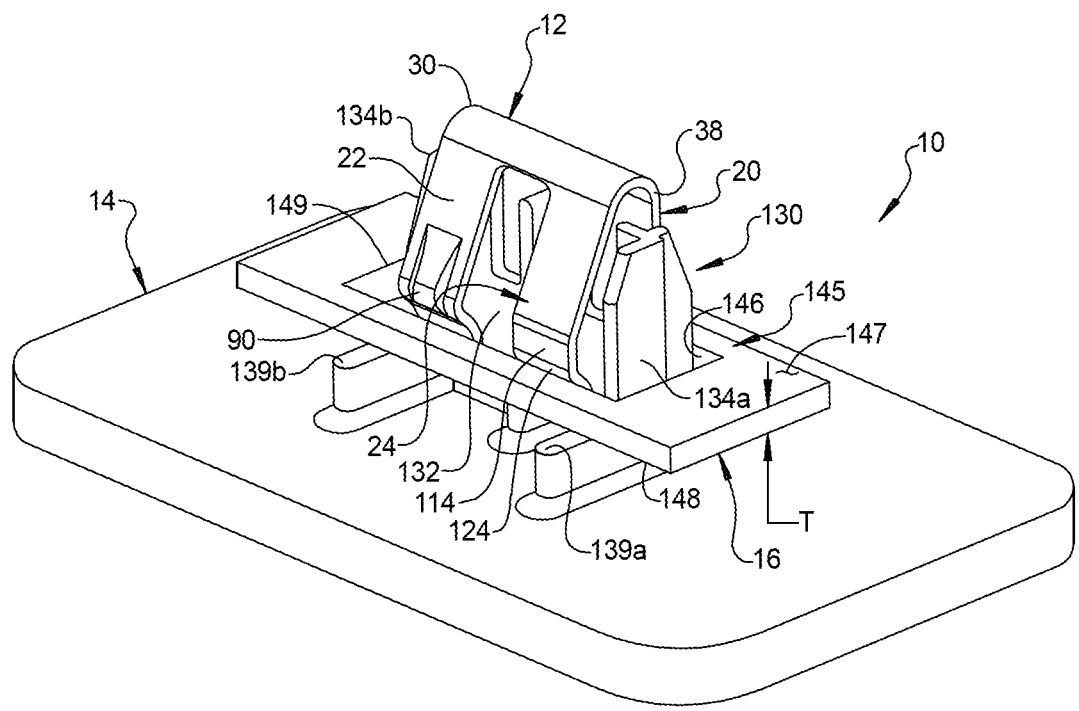
FIG. 1A is a perspective view of a fastening system, including a fastener and a fastener engagement feature, joining parts of a vehicle in accordance with the principles of the present disclosure.
Figure 1B:
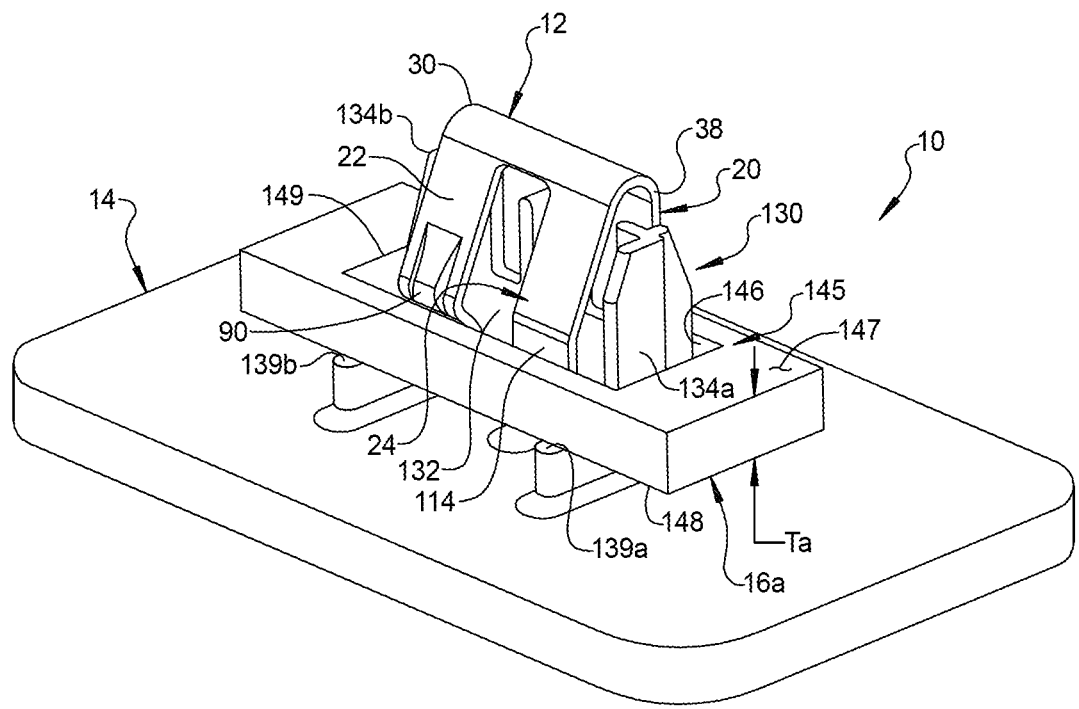
FIG. 1B is another perspective view of the fastening system of FIG. 1A.

With initial reference to FIG. 1A-1B, a fastening system constructed in accordance with the present disclosure is illustrated and identified at reference character 10. The fastening system 10 may include a fastener 12, and may be used in an automobile (not shown) or other similar vehicle to removably mount a first component 14 to a second component 16. According to one exemplary use, the first component 14 is a trim panel, and the second component 16 is a body portion of the automobile. It will be appreciated, however, that the present teachings may be adapted to join various components in the automobile.

The fastener 12 includes a main body portion or member 20, a first spring arm 22 and a second spring arm 24. The fastener 12 can be formed by stamping or any other suitable manufacturing process, such that the main body member 20 and the first and second spring arms 22, 24 define a monolithic construct. In this regard, in some configurations the fastener 12 is formed from a resilient or otherwise flexible metal such as spring steel, for example.

Figure 2:
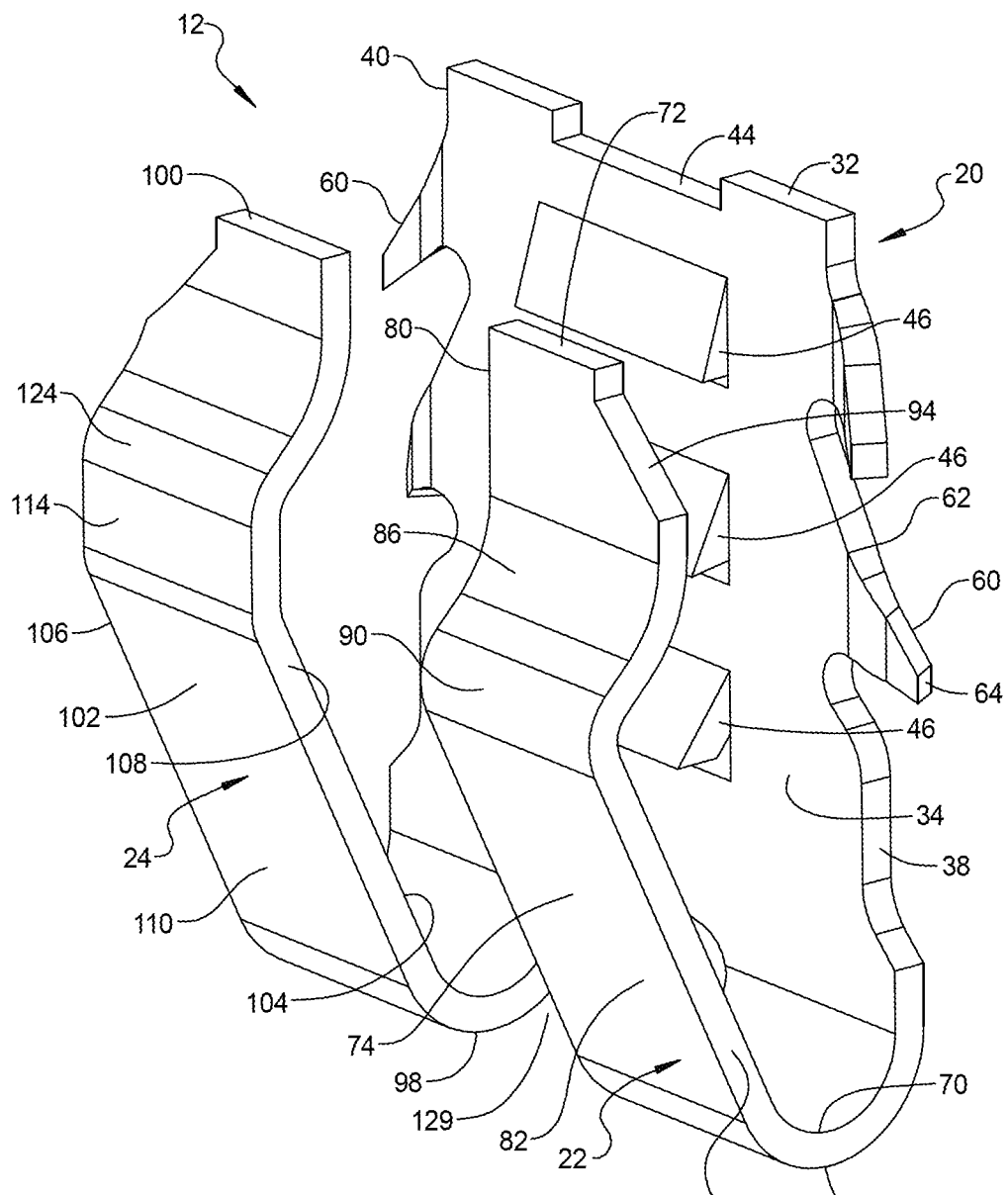
FIG. 2 is a perspective view of the fastener of FIG. 1A.
Figure 3A:
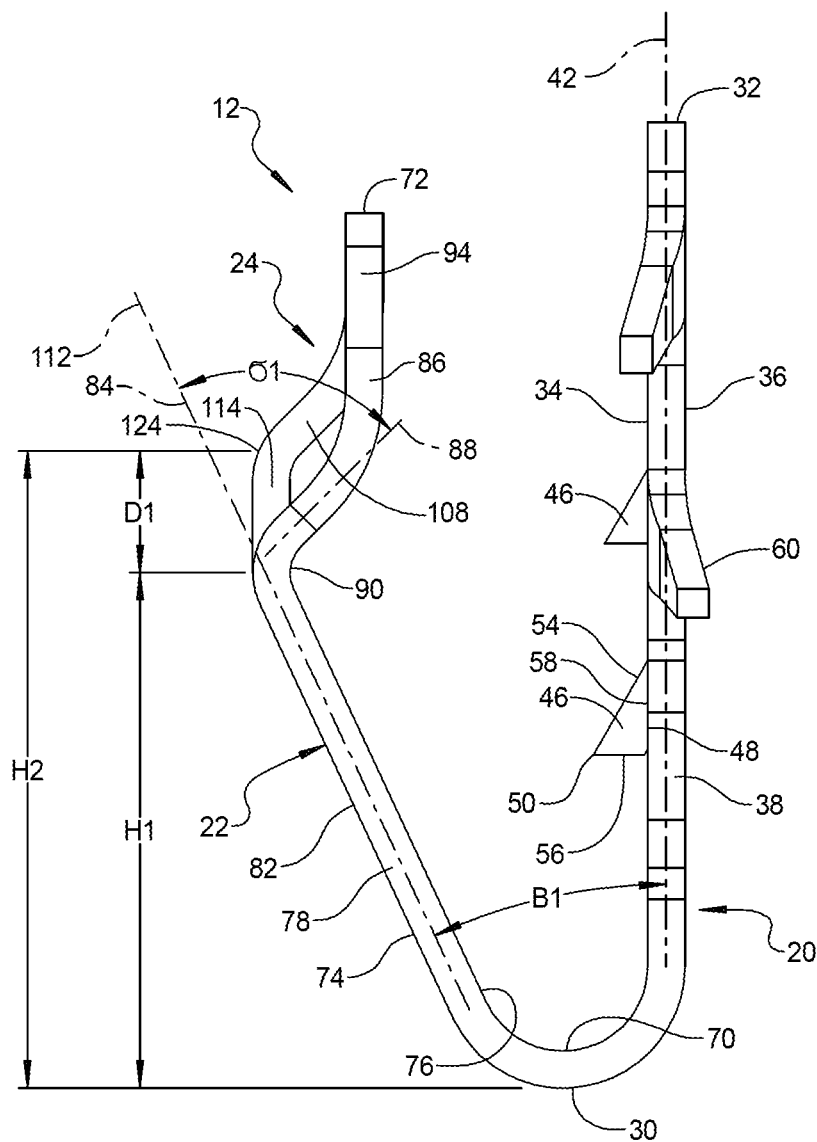
FIG. 3A is a side elevation view of a first side of the fastener of FIG. 2.

The main body member 20 includes a proximal end 30, a distal end 32, an anterior side 34, a posterior side 36, a first lateral side or edge 38, and a second lateral side or edge 40. As illustrated in FIG. 3A, the main body member 20 extends along a first or main body longitudinal axis 42 from and between the proximal and distal ends 30, 32. With reference to FIG. 2, the distal end 32 includes a recess 44. The recess 44 can be located in a central portion of the distal end 32. The anterior and posterior sides 34, 36 of the main body member 20 extend from and between the proximal and distal ends 30, 32, and from and between the first and second lateral edges 38, 40.

The anterior side 34 of the main body member 20 includes a plurality of teeth or louvers 46 extending therefrom. As illustrated in FIG. 3A, the louvers 46 extend from a base 48 to a tip 50, such that the louvers define a substantially triangular shape or profile. It will be appreciated that the louvers 46 may include other shapes or profiles within the scope of the present disclosure. As illustrated in FIG. 2, in some configurations the anterior side 34 can include three louvers 46. It will be appreciated, however, that the anterior side 34 may include more or fewer than three louvers within the scope of the present disclosure.

Figure 3B:
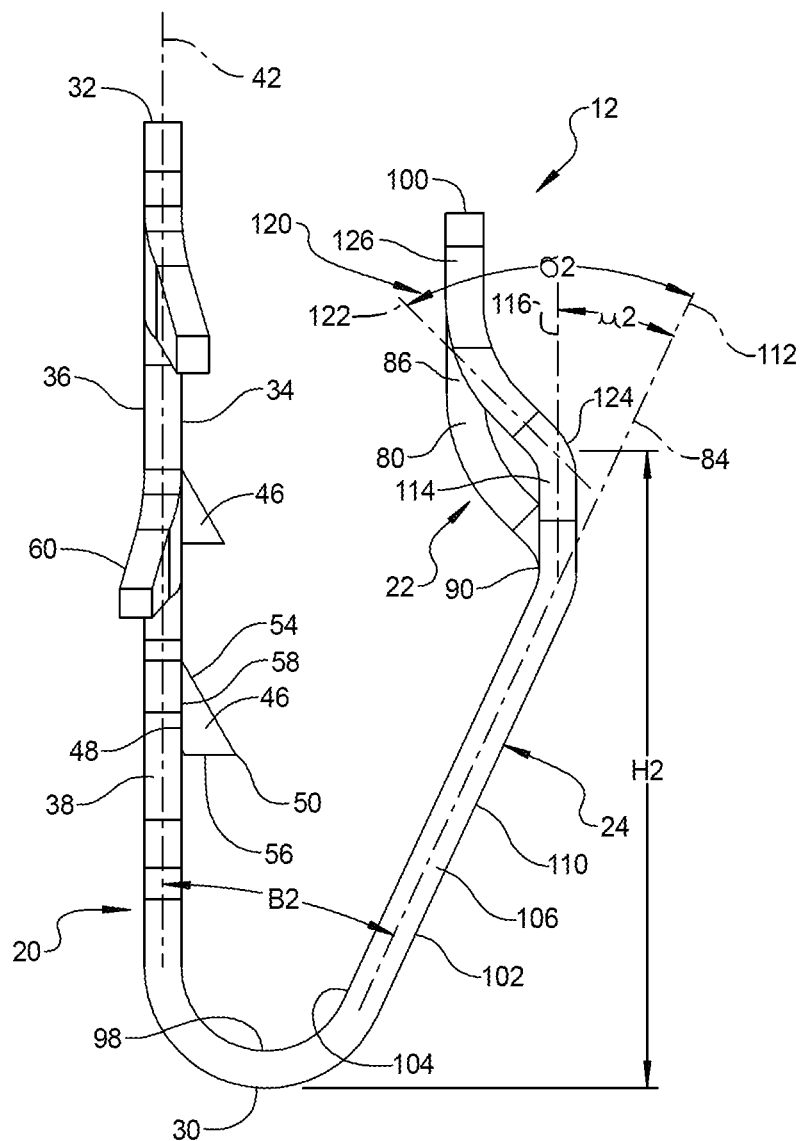
FIG. 3B is a side elevation view of a second side of the fastener of FIG. 2.
Figure 4:
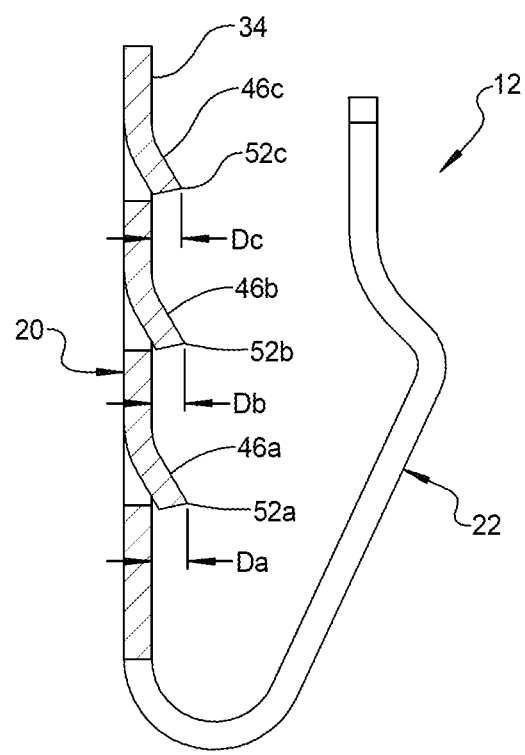
FIG. 4 is a cross-sectional view of the fastener of FIG. 2.

The louvers 46 extend a distance from the anterior side 34 to the tip 50. In this regard, the louvers 46 may define a substantially triangular shape. As illustrated in FIG. 3B, in some configurations, the triangular shape may be a right-triangular shape, including a hypotenuse 54 extending from the base 48 to the tip 50, an opposite side 56 extending from the tip 50 to the base 48, and an adjacent side 58 extending along the base 48. The opposite side 56 can extend in a direction substantially perpendicular to the main body longitudinal axis 42. The distance from the anterior side 34 to the tip 50 of a first louver 46a may be different than the distance from the anterior side 34 to the tip 50 of a second louver 46b. In this regard, as illustrated in FIG. 4, the main body member 20 can include the first louver 46a, the second louver 46b, and a third louver 46c. The first louver 46a extends a distance Da from the anterior side 34 to the tip 50a. The second louver 46b extends a distance Db from the anterior side 34 to the tip 50b. The third louver 46c extends a distance Dc from the anterior side 34 to the tip 50c. The distance Da is greater than the distance Db, and the distance Db is greater than the distance Dc.

Figure 5:
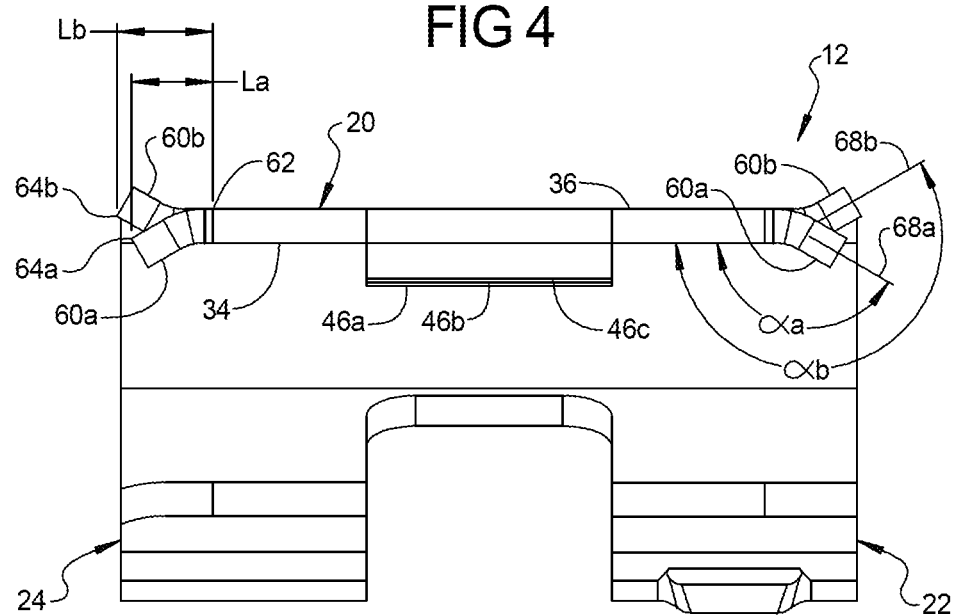
FIG. 5 is a bottom-side view of the fastener of FIG. 2.

The first and second lateral edges 38, 40 each include a plurality of saw teeth 60 extending therefrom. As illustrated, in some configurations the first and second lateral edges 38, 40 each include two teeth 60. It will be appreciated, however, that the edges 38, 40 can include more or fewer than two teeth 60 within the scope of the present disclosure. With reference to FIG. 2, the teeth 60 include a base portion 62 and a tip portion 64. The base portion 62 is adjacent the lateral edge 38 or 40. The teeth 60 define a length L from and between the base portion 62 and the tip portion 64. As illustrated in FIG. 5, the length L may vary from a first tooth 60a to a second tooth 60b. In this regard, the first tooth 60a can define a length La, and the second tooth 60b, disposed between the first tooth 60b and the distal end 32 of the main body member 20, can define a length Lb. The length Lb can be greater than the length Lb.

With reference to FIG. 5, each tooth 60 extends from the edge 38, 40 along an axis 68. The axis 68 can define an angle α with the anterior side 34 of the main body member 20. The angle α may be between one hundred sixty degrees and two hundred degrees. As illustrated in FIG. 5, in some configurations, an angle αa of the first tooth 60a can be between one hundred forty degrees and one hundred seventy degrees, and an angle αb of the second tooth 60b can be between two hundred degrees and two hundred twenty degrees. In one configuration, the angle αa may be substantially equal to one hundred fifty degrees, and the angle αb may be substantially equal to two hundred ten degrees. In this regard, it will be appreciated that the first tooth 60a extends or is otherwise inclined toward the anterior side 34 of the main body member 20, and the second tooth 60b extends or is otherwise inclined toward the posterior side 36 of the main body member 20, such that the first and second teeth 60a, 60b define an alternating or otherwise back-and-forth pattern.

With reference to FIGS. 2 and 3A, the first spring arm 22 is supported by the main body member 20 and disposed on the anterior side 34 of the main body member 20, such that at least a portion of the first spring arm 22 is inclined away from the anterior side 34 of the main body member 20. In this regard, the first spring arm 22 includes a proximal end 70, a distal end 72, an anterior side 74, a posterior side 76, a first or outer lateral edge 78, and a second or inner lateral edge 80. A proximal portion 82 of the first spring arm 22 extends from the proximal end 30 of the main body member 20 along a first proximal axis 84. The first proximal axis 84 defines a first proximal angle β1 with the main body member longitudinal axis 42, such that the proximal portion 82 is inclined away from the main body member 20. The first proximal angle β1 may be between twenty degrees and sixty degrees. In some configurations, the first proximal angle β1 may be substantially equal to forty degrees. In this regard, the main body member 20 and the proximal portion 82 of the first spring arm 22 may define a generally U-shaped construct.

A distal portion 86 of the first spring arm 22 extends from the proximal portion 82 along a first distal axis 88. The first distal axis 88 defines a first distal angle $\alpha 1$ with the first proximal axis 84, such that the distal portion 86 is inclined toward the main body member 20. The first distal angle $\alpha 1$ may be between seventy degrees and ninety degrees. In some configurations, the first distal angle $\alpha 1$ is substantially equal to eighty degrees. In this regard, the proximal and distal portions 82, 86 of the first spring arm 22 define a first bend or shoulder 90 therebetween. As will be described in more detail below, the first shoulder 90 may serve as a retaining feature to secure the fastener 12, and thus the first component 14, to the second component 16. Thus, the first shoulder 90 may be referred to as the first retaining feature 90, herein. As illustrated in FIG. 3A, the first shoulder 90 is located a first vertically-extending height H1 from the proximal end 30 of the main body member 20. In this regard, the first height H1 may be measured, and extend, along a line substantially parallel to the main body member longitudinal axis 42.

The distal portion 86 may further include an arcuate shape or construct extending from and between the first shoulder 90 and the distal end 72 of the first spring arm 22. In this regard, the anterior side 74 of the distal portion 86 may include a concave shape or profile. The outer lateral edge 78 of the first spring arm 22 may include an alignment feature 94. The alignment feature 94 may include, or otherwise be defined by, a chamfered portion of the outer lateral edge 78 that inclines toward the inner lateral edge 80.

With reference to FIGS. 2 and 3B, the second spring arm 24 may be generally similar to that of the first spring arm 22, apart from any exceptions described below and/or shown in the figures. In this regard, the second spring arm 24 is supported by the proximal end 30 of the main body member 20 and disposed on the anterior side 34 of the main body member 20, such that at least a portion of the first spring arm 22 is inclined away from the anterior side 34 of the main body member 20. In this regard, the second spring arm 24 includes a proximal end 98, a distal end 100, an anterior side 102, a posterior side 104, a first or outer lateral edge 106, and a second or inner lateral edge 108. A proximal portion 110 of the second spring arm 24 extends from the proximal end 30 of the main body member 20 along a second proximal axis 112. The second proximal axis 112 defines a second proximal angle $\beta 2$ with the main body member longitudinal axis 42, such that the proximal portion 110 is inclined away from the main body member 20. The second proximal angle $\beta 2$ may be between twenty degrees and sixty degrees. In some configurations, the second proximal angle $\beta 2$ may be substantially equal to forty degrees. In this regard, the second proximal angle $\beta 2$ may be substantially equal to the first proximal angle 61. Accordingly, the main body member 20 and the proximal portion 110 of the second spring arm 24 may define a generally U-shaped construct.

A central portion 114 of the second spring arm 24 extends from the proximal portion 110 along a second central axis 116. The second central axis 116 defines a second central angle $\mu 2$ with the second proximal axis 112. The second central angle $\mu 2$ may be between twenty degrees and sixty degrees. In some configurations, the second central angle $\mu 2$ may be substantially equal to forty degrees. In this regard, the second central angle $\mu 2$ may be substantially equal to the second proximal angle $\beta 2$. Accordingly, the central portion 114 may be substantially parallel to the main body member 20.

A distal portion 120 of the second spring arm 24 extends from the central portion 114 along a second distal axis 122. The second distal axis 122 defines a second distal angle $\alpha 2$ with the second proximal axis 112, such that the distal portion 120 is inclined toward the main body member 20. The first distal angle $\alpha 1$ may be between seventy degrees and ninety degrees. In some configurations, the second distal angle $\alpha 2$ is substantially equal to eighty degrees. In this regard, the second distal angle $\alpha 2$ may be substantially equal to the first distal angle $\alpha 1$. Accordingly, second spring arm 24 includes a second bend or shoulder 124. The second shoulder 124 may be defined by and/or between the central and distal portions 114, 120 of the second spring arm 24. As will be described in more detail below, the second shoulder 124 may serve as a retaining feature to secure the fastener 12, and thus the first component 14, to the second component 16. Thus, the second shoulder 124 may be referred to as the second retaining feature 124, herein. The second shoulder 124 is located a second vertically-extending height H2 from the proximal end 30 of the main body member 20. In this regard, the second height H2 may be measured, and extend, along a line substantially parallel to the main body member longitudinal axis 42. As illustrated in FIG. 2, the second height H2 of the second shoulder 124 is greater than the first height H1 of the first shoulder 90, such that the second shoulder 124 is separated from the first shoulder 90 by a distance D1 extending along a line substantially parallel to the to the main body member longitudinal axis 42.

The distal portion 120 may further include an arcuate shape or construct extending from and between the second shoulder 124 and the distal end 100 of the second spring arm 24. In this regard, the anterior side 102 of the distal portion 120 may include a concave shape or profile. The outer lateral edge 106 of the second spring arm 24 may include an alignment feature 126. The alignment feature 126 may include, or otherwise be defined by, a chamfered portion of the outer lateral edge 106.

As illustrated in FIG. 2, the first spring arm 22 may be spaced apart from the second spring arm 24 such that the inner lateral edge 80 of the first spring arm 22 and the inner lateral edge 108 of the second spring arm 24 define a cutout region or void 129 therebetween.

Figure 6:
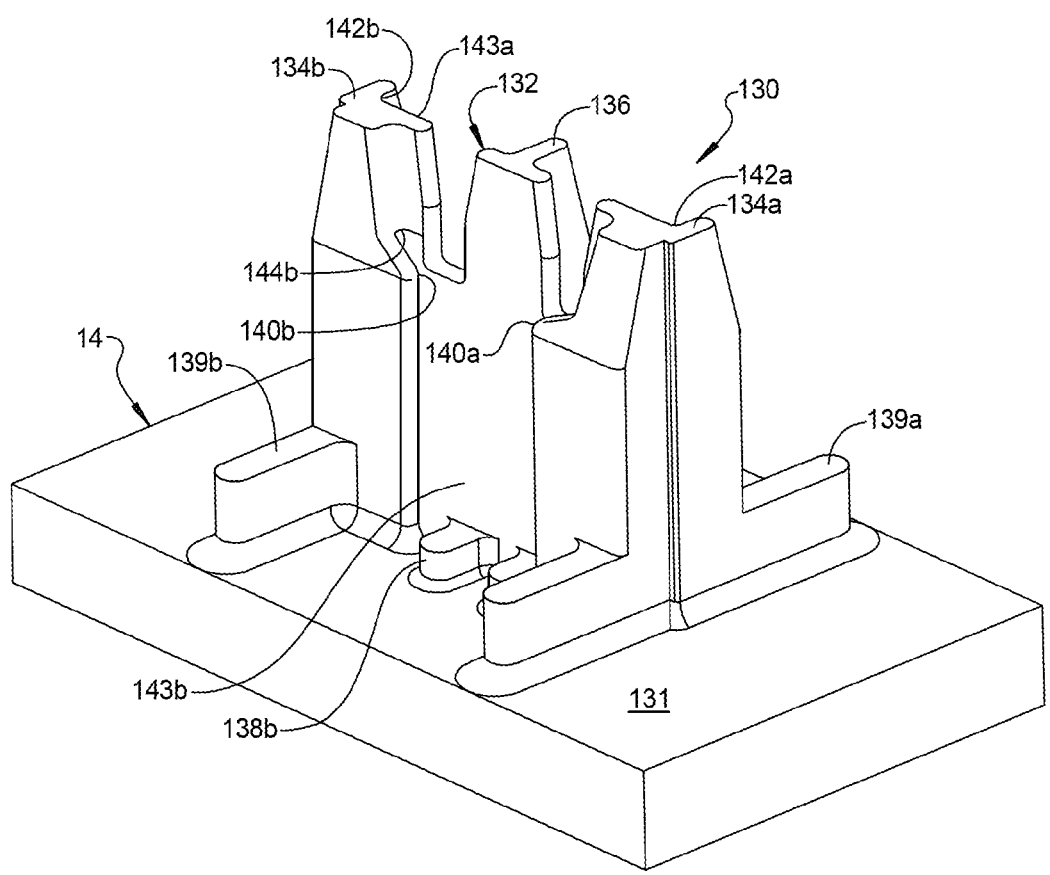
FIG. 6 is a perspective view of the fastener engagement feature of FIG. 1A.
Figure 7:
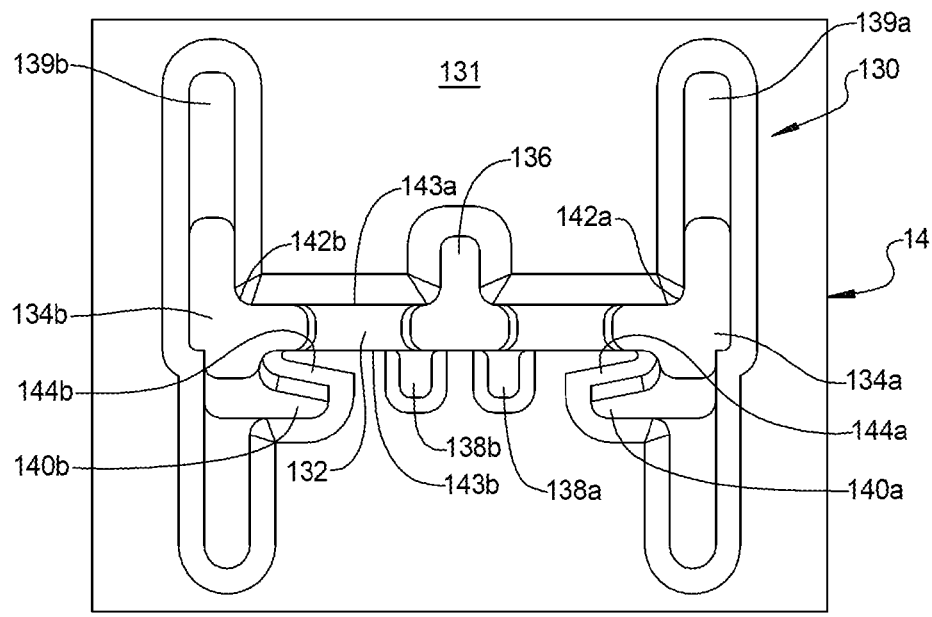
FIG. 7 is a top-side view of the fastener engagement feature of FIG. 1A.

With reference to at least FIGS. 1A and 1B, the first component 14 includes a rib or first fastener engagement feature 130 extending from a surface 131 thereof. In this regard, the first fastener engagement feature 130 may be referred to herein as the rib or extension feature 130. As illustrated in FIGS. 6 and 7, the extension feature 130 can be a monolithically-formed construct, including a web portion 132, opposed end or side portions 134a, 134b, an alignment feature or portion 136, a fastener stop portion 138, and opposed lip or flange portions 140a, 140b.

Figure 8:
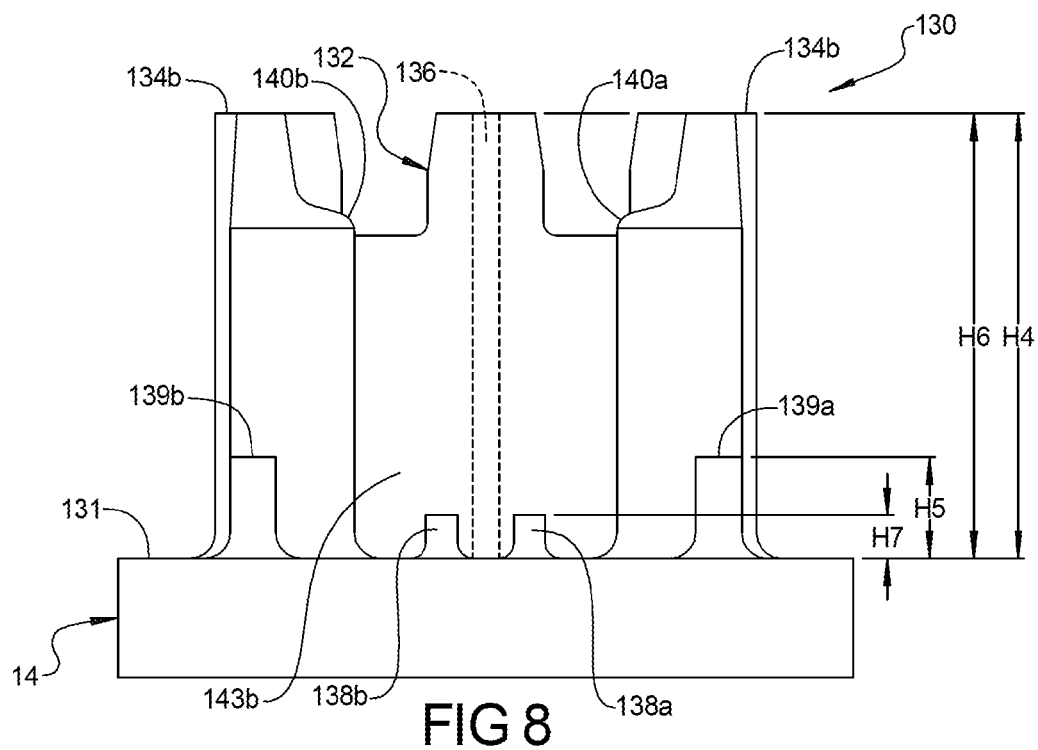
FIG. 8 is a side elevation view of the fastener engagement feature of FIG. 1A.

The web portion 132 extends laterally from a first end 142a to a second end 142b. The side portions 134a, 134b can be located at the first and second ends 142a, 142b of the web portion 132. In this regard, the side portions 134a, 134b can extend longitudinally from the first and second ends 142a, 142b. The side portions 134a, 134b include stop portions 139a, 139b. As illustrated in FIG. 8, the side portions 134a, 134b can include a side height H4 relative to the surface 131 of the first component 14, and the stop portions 139a, 139b can include a first stop height H5 relative to the surface 131 of the first component 14. The first stop height H5 is lower than the side height H4. In this regard, the stop portions 139a, 139b can be recessed relative to the side portions 134a, 134b. The stop portions 139a, 139b can be located on first or anterior side 143a of the web portion 132.

The alignment portion 136 can be located between the first and second ends 142a, 142b of the web portion 132. In this regard, the alignment portion 136 can extend longitudinally from the anterior side 143a of the web portion 132. As illustrated in FIG. 8, in some configurations, the alignment portion 136 can be centrally located between the side portions 134a, 134b and have a height H6 that is substantially equal to the height H4 of the side portions 134a, 134b. The fastener stop portion 138 can be located between the first and second ends 142a, 142b of the web portion 132. In this regard, the fastener stop portion 138 can extend laterally from a second or posterior side 143b of the web portion 132, opposite the first side 143a. As illustrated, in some configurations the fastener stop portion 138 can include a first portion 138a and a second portion 138b. The first and second portions 138a, 138b can be centrally located between the end portions 134a, 134b, and can include a second stop height H7. The second stop height H7 can be less than the first stop height H5.

The flange portions 140a, 140b can extend laterally from the side portions 134a, 134b, respectively. The flange portions 140a, 140b are located on the second side 143b of the web portion 132. In this regard, with reference to FIG. 7, the first fastener engagement feature 130 can include opposed channels 144a, 144b. The channels 144a, 144b can be at least partially defined by and between the flange portions 140a, 140b and the second side 143b of the web portion 132. As illustrated in FIG. 7, in some configurations, the channels 144a, 144b are defined by the web portion 132, the side portions 134a, 134b and the flange portions 140a, 140b.

As illustrated in FIG. 1A, the second component 16 includes a second fastener engagement feature 145. The second fastener engagement feature 145 includes a first engagement edge or surface 146, a second engagement edge or surface 147, and a stop surface 148. The first engagement surface 146 defines the inner perimeter of an aperture 149 through the second component 16. The aperture 149 may define a substantially rectangular shape. The second engagement surface 147 may be opposite the stop surface 148. In this regard, the aperture 149 can extend through the second engagement surface 147 and the stop surface 148.

With reference to FIGS. 1A and 8-10, in an assembled configuration the fastener 12 is removably coupled to the first and second fastener engagement features 130, 145, such that the first component 14 is removably coupled to the second component 16. In this regard, the main body member 20 may be positioned on the second side 143b of the web portion 132, and within the channels 144a, 144b. The first spring arm 22 can be positioned between the side portion 134a and the alignment portion 136, and the second spring arm 24 can be positioned between the side portion 134b and the alignment portion 136. In this regard, the alignment portion 136 can be aligned with the void 129. It will be appreciated that, in this way, the alignment portion 136 helps to prevent a user from incorrectly assembling the fastener 12 onto the first fastener engagement feature 130. Specifically, if the fastener 12 is rotated by one hundred eighty degrees about the axis 42, such that the main body member 20 is positioned on the first side 143a of the web portion 132, the alignment portion 136 will engage the main body member 20, and prevent the user from assembling the fastener 12 onto the first fastener engagement feature 130.

Figure 9:
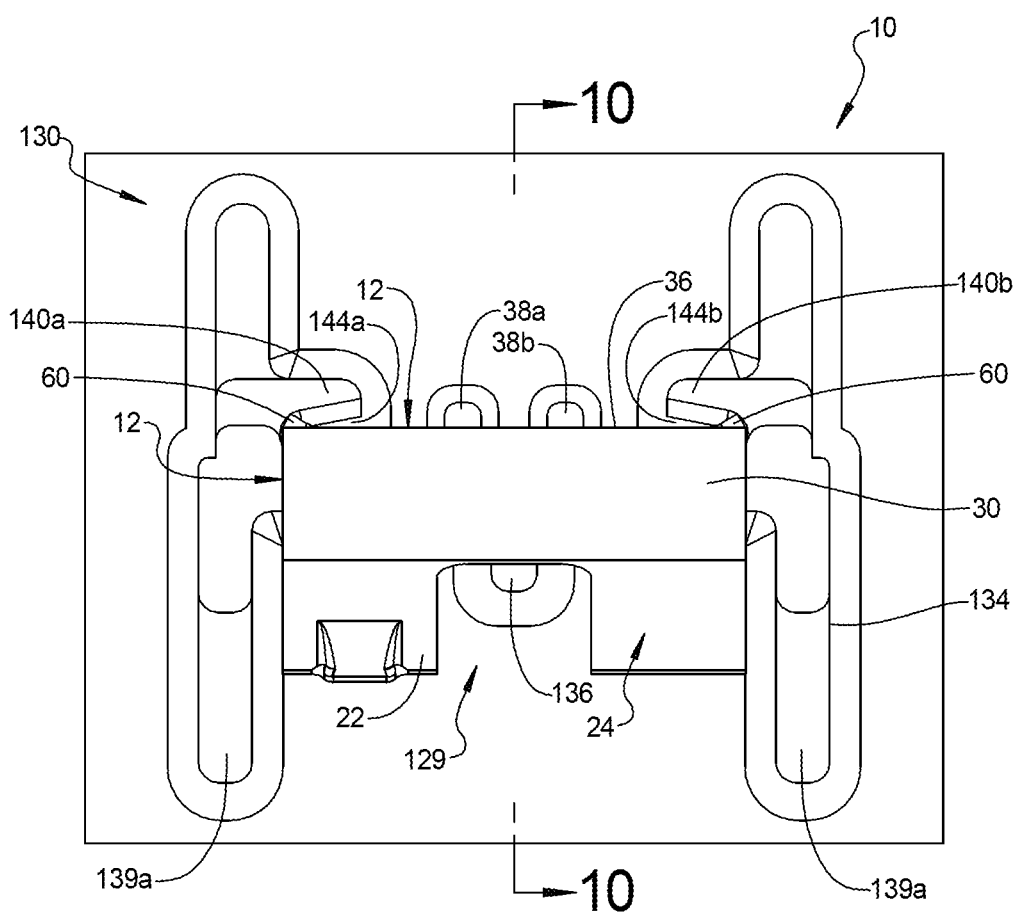
FIG. 9 is a top-side view of the fastening system of FIG. 1A.
Figure 10:
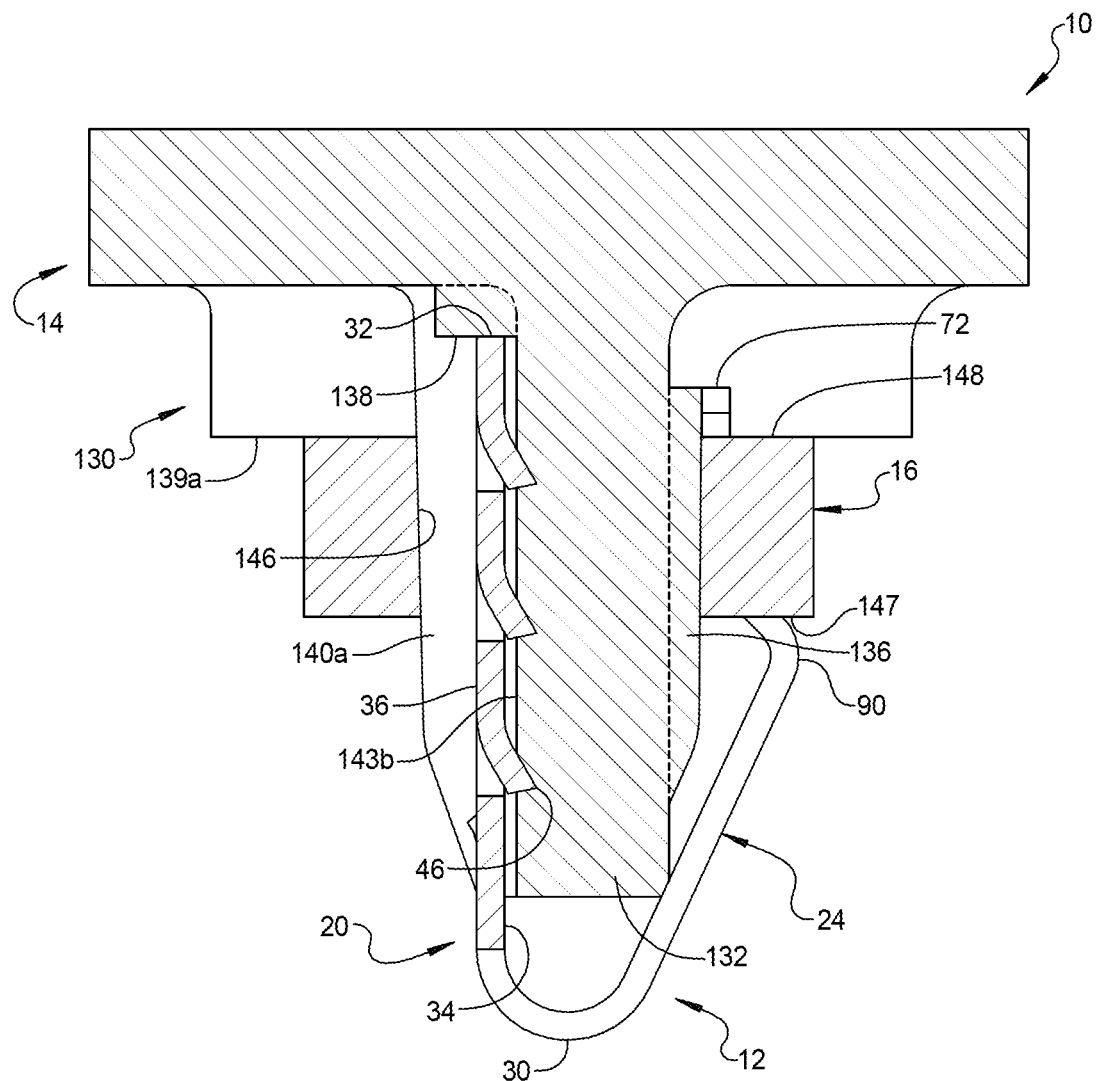
FIG. 10 is a cross-sectional view of the fastening system of FIG. 1A, taken through the line 10-10 of FIG. 9.

As illustrated in FIG. 9, as the user assembles the fastener 12 to the first fastener engagement feature 130, the teeth 60 engage or otherwise cut into at least one of the web portion 132, the side portions 134a, 134b and/or the flange portions 140a, 140b. In this regard, the angle αa can allow the first tooth 60a to engage one of the web portion 132 and the flange portions 140a, 140b, and the angle αb can allow the second tooth 60b to engage another of the web portion 132 and the flange portions 140a, 140b. In addition, as illustrated in FIG. 10, the louvers 46 can engage the second side 143b of the web portion. In this regard, as the user assembles the fastener 12 to the first fastener engagement feature 130, the first louver 46a can remove a first amount of material from the web portion 132, the second louver 46b can remove a second amount of material from the web portion 132, and the third louver 46c can remove a third amount of material from the web portion 132, such that the first, second and third louvers 46a, 46b, 46c are engaged with the web portion 132 when the fastener 12 is assembled onto the first fastener engagement feature 130. When the fastener 12 is in the assembled or seated position, the distal end 32 of the main body member 20 can engage the fastener stop portion 138 of the first engagement feature 130. In this regard, the fastener stop portion 138 can be disposed within the recess 44 of the main body member 20. As the distal end 32 engages the fastener stop portion 138, the positioning of the fastener stop portion 138 within the recess 44 can provide an audible and/or tactile indicator to the user that the fastener 12 is correctly and fully assembled onto the first fastener engagement feature 130.

To assemble the fastener 12 and the first component 14 to the second component 16, the user can position the fastener 12 and the first fastener engagement feature 130 within the second fastener engagement feature 145, such that at least one of the first and second retaining features 90, 124 engages the second engagement surface 147. In this regard, in the assembled configuration, the distal portions 86, 120 of the first and second arms 22, 24 can extend through the aperture 149 and engage at least one of the first engagement surface 146 and the stop surface 148, while one of the first and second retaining features 90, 124 can engage the second engagement surface 147.

With reference to FIG. 1A, in some configurations the fastener 12 can be used with the second component 16 having a first thickness T. With reference to FIG. 1B, in other configurations, the fastener 12 can be used with a second component 16a having a second thickness Ta that is greater than the first thickness T. In this regard, the difference between the first and second thicknesses T, Ta can be substantially equal to the distance D1 between the first and second retaining features 90, 124. It can be possible to use the fastener with a component having virtually any thickness between the first and second thicknesses T, Ta.

As illustrated in FIG. 1B, when the fastener 12 is assembled with the second component 16a, the distal portion 86 of the first spring arm 22 and the central portion 114 of the second spring arm 24 can engage the first engagement surface 146, while the first retaining feature 90 of the first spring arm 22 can engage the second engagement surface 147. As illustrated, the second retaining feature 124 can be disengaged from the second component 16a.

As illustrated in FIG. 1A, when the fastener 12 is assembled with the second component 16, the distal portions 86, 120 of the first and second spring arms 22, 24 can engage the first engagement surface 146, while the second retaining feature 124 of the second spring arm 24 can engage the second engagement surface 147. As illustrated, the first retaining feature 90 can be disengaged from the second component 16b. In this way, the fastener 12 can allow the user to couple the first component 14 to the second component 16 having the first thickness T, and to the second component 16a having the second thickness Ta.

As illustrated in FIGS. 1A, 1B and 10, in the fully assembled configuration, the stop surface 148 of the second fastener engagement feature 145 can engage, or otherwise be seated against, the stop portions 139a, 139b of the first engagement feature 130.

Figure 11:
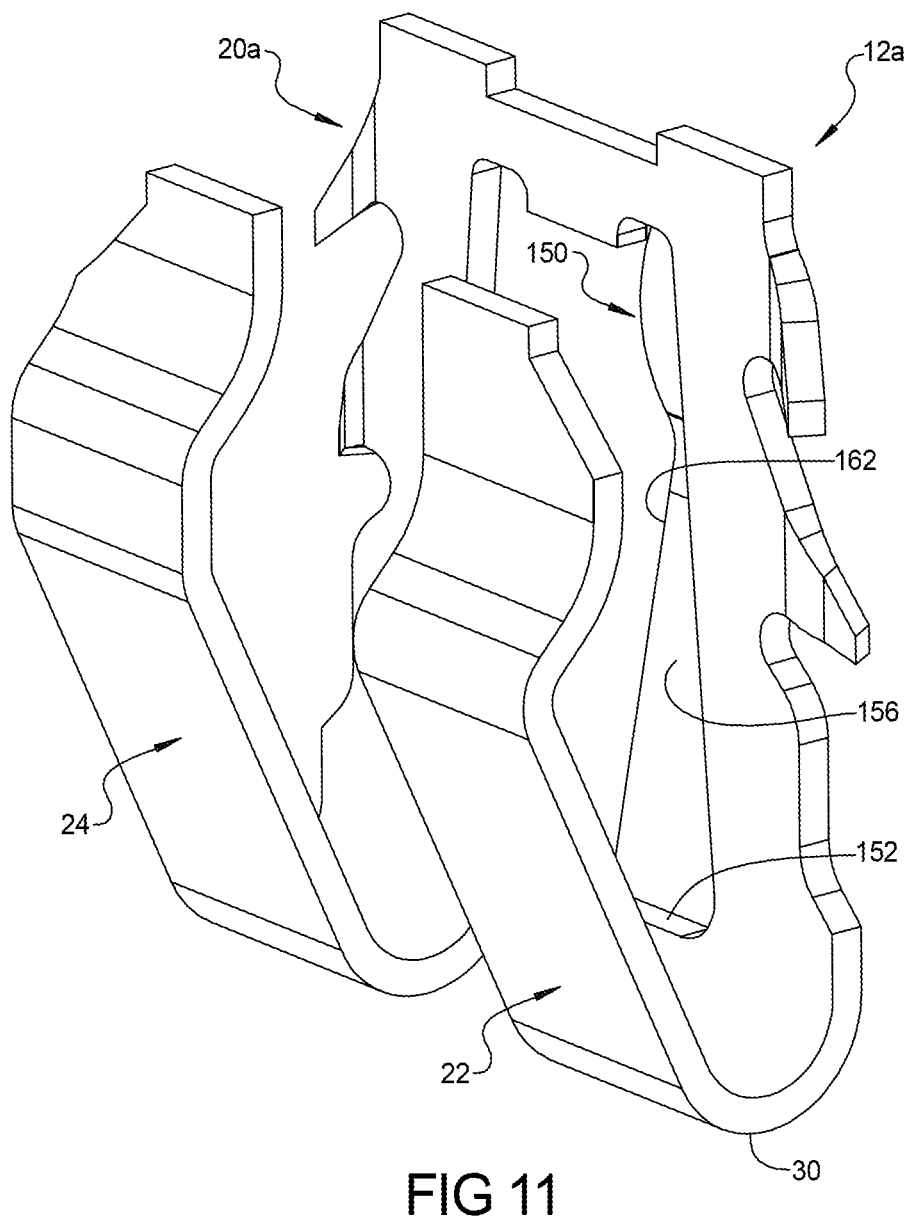
FIG. 11 is a perspective view of another fastener in accordance with the principles of the present disclosure, for use with the fastener engagement feature of FIG. 1A.
Figure 12:
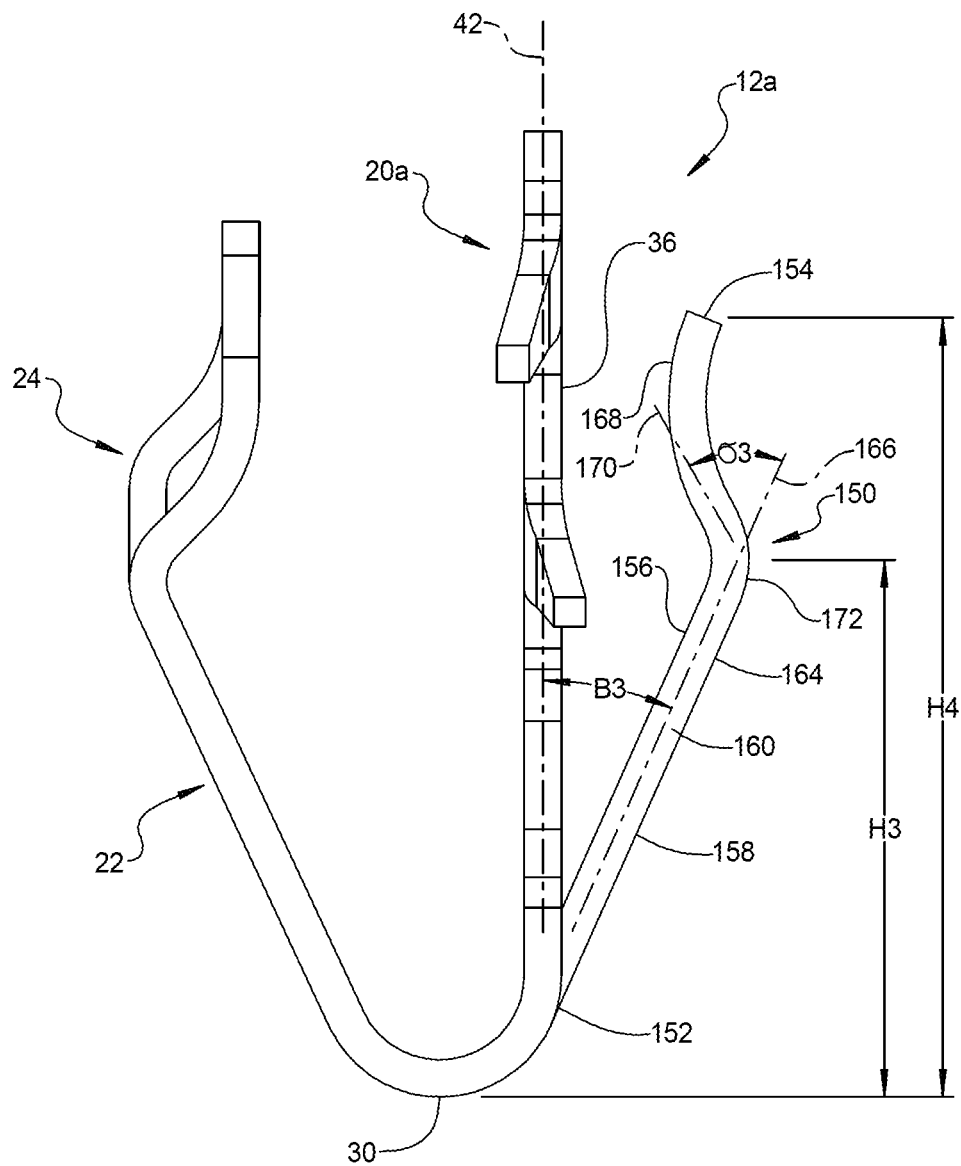
FIG. 12 is a side elevation view of the fastener of FIG. 11.

With reference to FIGS. 11 and 12, another configuration of a fastener 12a is shown. The structure, function and method of manufacturing the fastener 12a may be generally similar to that of the fastener 12, apart from any exceptions described below and/or shown in the figures. Therefore, the structure, function and/or method of manufacturing the fastener 12a will only be described herein with respect to the differences relative to the fastener 12. In addition, like reference numerals are used hereinafter and in the drawings to identify like components, while like reference numerals containing letter extensions are used to identify those components that have been modified.

The fastener 12a includes a third spring arm 150 is supported by, and disposed on the posterior side 36 of, the main body member 20a, such that at least a portion of the third spring arm 150 is inclined away from the posterior side 36. In this regard, the third spring arm 150 includes a proximal end 152, a distal end 154, an anterior side 156, a posterior side 158, a first lateral edge 160, and a second lateral edge 162. A proximal portion 164 of the third spring arm 150 extends from the proximal end 30 of the main body member 20a along a third proximal axis 166. The third proximal axis 166 defines a third proximal angle β3 with the main body member longitudinal axis 42, such that the proximal portion 164 is inclined away from the main body member 20a. The third proximal angle β3 may be between twenty degrees and sixty degrees. In some configurations, the third proximal angle β3 may be substantially equal to forty degrees. In this regard, the main body member 20a and the proximal portion 164 of the third spring arm 150 may define a generally V- or U-shaped construct.

A distal portion 168 of the third spring arm 150 extends from the proximal portion 164 along a third distal axis 170. The third distal axis 170 defines a third distal angle α3 with the third proximal axis 166, such that the distal portion 168 is inclined toward the main body member 20a. The third distal angle α3 may be between forty-five degrees and ninety degrees. In some configurations, the third distal angle α3 is substantially equal to seventy degrees. In this regard, the proximal and distal portions 164, 168 of the third spring arm 150 define a third bend or shoulder 172 therebetween. As will be described in more detail below, the third shoulder 172 may serve as a retaining feature to secure the fastener 12a, and thus the first component 14, to the second component 16. Thus, the third shoulder 172 may be referred to as the third retaining feature 172, herein.

The third shoulder 172 is located a third vertically-extending height H3 from the proximal end 30 of the main body member 20a. In this regard, the third height H3 may be measured, and extend, along a line substantially parallel to the main body member longitudinal axis 42. In some configurations, the third height H3 may be substantially equal to the first height H1 of the first shoulder 90. The distal portion 168 may further include an arcuate shape or construct extending from and between the third shoulder 172 and the distal end 154 of the third spring arm 150. In this regard, the distal portion 168 may be inclined toward the main body member 20a. The distal end 154 may be located a fourth vertically-extending height H4 from the proximal end 30 of the main body member 20a. In this regard, the fourth height H4 may be measured, and extend, along a line substantially parallel to the main body member longitudinal axis 42. In some configurations, the fourth height H4 may be substantially equal to the second height H2 of the second shoulder 124. Accordingly, when the fastener 12a is assembled with the second component 16, the third retaining feature 172 of the third spring arm 150 can engage the second engagement surface 147. When the fastener 12a is assembled with the second component 16a, the distal end 154 of the third spring arm 150 can engage the second engagement surface 147. In addition, the alignment portion 136 can engage the third spring arm 150 to prevent the user from assembling the fastener 12a onto the first fastener engagement feature 130 when the main body member 20 and the first and second spring arm 22, 24 are disposed on the second side 143b of the web portion 132.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A resilient metal fastener usable with a panel having either a first thickness or a second thickness, the fastener comprising:
    a main body member including an anterior side and a posterior side;
    a first spring arm supported by the main body member such that the first spring arm is disposed on the anterior side of the main body member, the first spring arm including a first shoulder portion positioned to engage against a surface of a first panel having the first thickness; and
    a second spring arm supported by the main body member such that the second spring arm is disposed on the anterior side of the main body member, the second spring arm including a second shoulder portion positioned to engage against a surface of a second panel, the second panel having the second thickness which is less than the first thickness;
    wherein the main body member further includes a first lateral end and a second lateral end, the first and second lateral ends each including a plurality of laterally-extending saw teeth.

2. The fastener of claim 1, wherein the first spring arm forms a first angle with the main body member, and the second spring arm forms a second angle with the main body member, the second angle substantially equal to the first angle.

3. The fastener of claim 1, wherein the first shoulder is disposed at a first vertically-extending distance from a proximal end of the main body member, and the second shoulder is disposed at a second vertically-extending distance from the proximal end of the main body member, the second vertically-extending distance being greater than the first vertically-extending distance.

4. The fastener of claim 3, wherein the value of the second vertically-extending distance less the value of the first vertically-extending distance is substantially equal to the value of the first thickness less the value of the second thickness.

5. The fastener of claim 1, wherein the plurality of laterally-extending saw teeth comprise a first set of saw teeth inclined toward the anterior side that are alternatingly disposed with a second set of saw teeth inclined toward the posterior side.

6. The fastener of claim 5, wherein the plurality of laterally-extending saw teeth comprise a first row of saw teeth each with a distal end extending laterally a first distance, and a second row of saw teeth each with a distal end extending laterally a second distance, the second distance being greater than the first distance, wherein the first row of saw teeth is disposed closer to a distal end of the main body than the second row of saw teeth.

7. The fastener of claim 1, wherein the plurality of laterally-extending saw teeth comprise a first row of saw teeth each with a distal end extending laterally a first distance, and a second row of saw teeth each with a distal end extending laterally a second distance, the second distance being greater than the first distance, wherein the first row of saw teeth is disposed closer to a distal end of the main body than the second row of saw teeth.

8. The fastener of claim 1, further comprising a third spring arm supported by the main body member such that the third spring arm is disposed on the posterior side of the main body member, the third spring arm including a distal portion extending from a third shoulder portion and positioned to capture any one of an aperture edge of the first panel and an aperture edge of the second panel.

9. The fastener of claim 8, wherein the third spring arm includes a distal end configured to engage against the surface of the second panel.

10. The fastener of claim 1, wherein the anterior side of the main body member includes a plurality of anteriorly-extending louvers.

11. The fastener of claim 10, wherein a distal end of a first of the louvers extends a first distance from an anterior surface of the main body member, and a distal end of a second of the louvers extends a second distance from the anterior surface of the main body member, the second distance being greater than the first distance.

12. The fastener of claim 11, wherein the first of the louvers is disposed closer to a distal end of the main body than the second of the louvers.

13. The fastener of claim 1, wherein the first spring arm includes a first distal portion extending from the first shoulder portion and the second spring arm includes a second distal portion extending from the first shoulder portion, and wherein the first and second distal portions are positioned to capture any one of an aperture edge of the first panel and an aperture edge of the second panel.

14. A resilient metal fastener couplable to a base panel and usable to couple the base panel with a panel having either a first thickness or a second thickness, the fastener comprising:
    a main body member including a proximal end, a distal end, an anterior side and a posterior side, the main body member extending along a main longitudinal axis from and between the proximal and distal ends and the main body member having a plurality of integrally extending coupling projections designed to engage and couple the resilient metal fastener to the base panel;

a first spring arm extending from the main body member along a first spring arm axis, the first spring arm axis forming a first angle with the main longitudinal axis, such that the first spring arm is disposed on the anterior side of the main body member, the first spring arm including a first shoulder positioned to engage against a surface of a first panel having the first thickness; and a second spring arm extending from the main body member along a second spring arm axis, the second spring arm axis forming a second angle with the main longitudinal axis, such that the second spring arm is disposed on the anterior side of the main body member, the second spring arm including a second shoulder, the second shoulder offset from the first shoulder by an offset distance measured in a direction substantially parallel to the main longitudinal axis, such that the second shoulder is positioned to engage against a surface of a second panel having the second thickness, wherein the second thickness is less than the first thickness;

wherein each of the main body member including the integrally extending coupling protections, the first spring arm and the second spring arm are all integral portions of a single-piece metal sheet.

15. The fastener of claim 14, wherein the first spring arm forms a first angle with the main body member, and the second spring arm forms a second angle with the main body member, the second angle substantially equal to the first angle.

16. The fastener of claim 14, wherein the first shoulder is disposed at a first vertically-extending distance from a proximal end of the main body member, and the second shoulder is disposed at a second vertically-extending distance from the proximal end of the main body member, the second vertically-extending distance being greater than the first vertically-extending distance.

17. The fastener of claim 16, wherein the value of the second vertically-extending distance less the value of the first vertically-extending distance is substantially equal to the value of the offset distance.

18. The fastener of claim 14, wherein the main body member further includes a first lateral end and a second lateral end, the first and second lateral ends including the plurality of coupling protections in the form of a plurality of laterally-extending saw teeth.

19. The fastener of claim 18, wherein the plurality of laterally-extending saw teeth comprise a first set of saw teeth inclined toward the anterior side that are alternatingly disposed with a second set of saw teeth inclined toward the posterior side.

20. The fastener of claim 19, wherein the plurality of laterally-extending saw teeth comprise a first row of saw teeth each with a distal end extending laterally a first distance, and a second row of saw teeth each with a distal end extending laterally a second distance, the second distance being greater than the first distance, wherein the first row of saw teeth is disposed closer to the distal end of the main body member than the second row of saw teeth.

21. The fastener of claim 18, wherein the plurality of laterally-extending saw teeth comprise a first row of saw teeth each with a distal end extending laterally a first distance, and a second row of saw teeth each with a distal end extending laterally a second distance, the second distance being greater than the first distance, wherein the first row of saw teeth is disposed closer to the distal end of the main body member than the second row of saw teeth.

22. The fastener of claim 14, further comprising a third spring arm supported by the main body member such that the third spring arm is disposed on the posterior side of the main body member, the third spring arm including a distal portion extending from a third shoulder portion and positioned to capture any one of an aperture edge of the first panel and an aperture edge of the second panel, wherein the third spring arm is another integral extension of the single-piece metal sheet.

23. The fastener of claim 14, wherein the anterior side of the main body member includes the plurality of coupling projections in the form of a plurality of anteriorly-extending louvers.

24. The fastener of claim 23, wherein a distal end of a first of the louvers extends a first distance from an anterior surface of the main body member, and a distal end of a second of the louvers extends a second distance from the anterior surface of the main body member, the second distance being greater than the first distance.

25. The fastener of claim 24, wherein the first of the louvers is disposed closer to the distal end of the main body member than the second of the louvers.

26. The fastener of claim 14, wherein the first spring arm includes a first distal portion extending from the first shoulder portion and the second spring arm includes a second distal portion extending from the first shoulder portion, and wherein the first and second distal portions are positioned to capture any one of an aperture edge of the first panel and an aperture edge of the second panel.

\* \* \* \* \*

UNITED STATES PATENT AND TRADEMARK OFFICE
CERTIFICATE OF CORRECTION

PATENT NO. : 9,657,759 B2
APPLICATION NO. : 14/482083
DATED : May 23, 2017
INVENTOR(S) : Steven Michael Benedetti Page 1 of 1

It is certified that error appears in the above-identified patent and that said Letters Patent is hereby corrected as shown below:

In the Claims

Column 13, Claim 14, Line 23, delete "protections," and insert --projections,-- therefor.

Column 13, Claim 18, Line 45, delete "protections," and insert --projections,-- therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*